(12) United States Patent
Perstling

(10) Patent No.: US 12,459,799 B2
(45) Date of Patent: Nov. 4, 2025

(54) FORK TINE AND LOGISTICS VEHICLE

(71) Applicant: Agilox Systems GmbH, Neukirchen bei Lambach (AT)

(72) Inventor: Manuel Perstling, Steinhaus (AT)

(73) Assignee: Agilox Systems GmbH, Neukirchen bei Lambach (AT)

( * ) Notice: Subject to any disclaimer, the term of this patent is extended or adjusted under 35 U.S.C. 154(b) by 0 days.

(21) Appl. No.: 18/032,737

(22) PCT Filed: Oct. 18, 2021

(86) PCT No.: PCT/AT2021/060386
§ 371 (c)(1),
(2) Date: Apr. 19, 2023

(87) PCT Pub. No.: WO2022/082243
PCT Pub. Date: Apr. 28, 2022

(65) Prior Publication Data
US 2023/0391595 A1    Dec. 7, 2023

(30) Foreign Application Priority Data
Oct. 23, 2020   (AT) .............................. A 50916/2020

(51) Int. Cl.
*B66F 9/16*    (2006.01)
*B66F 9/12*    (2006.01)

(52) U.S. Cl.
CPC ............... *B66F 9/165* (2013.01); *B66F 9/12* (2013.01)

(58) Field of Classification Search
CPC .......... B66F 9/165; B66F 9/12; G01G 19/083
See application file for complete search history.

(56) References Cited

U.S. PATENT DOCUMENTS

| | | | | |
|---|---|---|---|---|
| 2,935,213 | A * | 5/1960 | Cellitti ................. | G01G 19/083 177/139 |
| 6,730,861 | B1 * | 5/2004 | Simons ................ | G01G 19/083 177/139 |
| 10,168,202 | B2 * | 1/2019 | Richards ................ | G01G 21/23 |
| 2003/0234122 | A1 * | 12/2003 | Kroll .................... | G01G 19/083 177/146 |
| 2008/0178690 | A1 * | 7/2008 | Simons ................ | G01G 19/083 73/862.541 |

(Continued)

FOREIGN PATENT DOCUMENTS

| | | | |
|---|---|---|---|
| CN | 106395692 A | * | 2/2017 |
| DE | 43 15 891 C1 | | 8/1994 |

(Continued)

OTHER PUBLICATIONS

Machine translation of CN 106395692 A (Year: 2017).*

(Continued)

*Primary Examiner* — Anna M Momper
*Assistant Examiner* — Michelle M Mudwilder
(74) *Attorney, Agent, or Firm* — GREENBLUM & BERNSTEIN, P.L.C.

(57) ABSTRACT

A fork tine for preferably automated logistics vehicles include at least a shank, a heel and a blade. Fastening elements for attachment to a logistics vehicle are arranged on the shank. To form a cavity, the fork blade is made from a top layer and a rear layer which are joined, in particular screwed together, by fasteners, in particular screws.

11 Claims, 5 Drawing Sheets

(56) References Cited

U.S. PATENT DOCUMENTS

| | | | | |
|---|---|---|---|---|
| 2016/0047688 A1* | 2/2016 | Richards | ................... | B66F 9/12 |
| | | | | 177/139 |
| 2017/0261364 A1* | 9/2017 | Liang | ................... | G01G 19/083 |
| 2020/0141790 A1* | 5/2020 | Van Den Berg | .......... | B66F 9/12 |

FOREIGN PATENT DOCUMENTS

| | | | | | |
|---|---|---|---|---|---|
| DE | 19729124 | C2 * | 4/2003 | .............. | B66F 9/122 |
| DE | 102009056419 | A1 * | 6/2011 | ................ | B66F 9/12 |
| DE | 102011111508 | A1 * | 2/2013 | ................ | B66F 9/12 |
| DE | 202015103246 | U1 * | 10/2015 | ................ | B66F 9/12 |
| DE | 102015121151 | A1 * | 5/2017 | | |
| DE | 102019102846 | A1 | 8/2020 | | |
| EP | 0 739 854 | A1 | 10/1996 | | |
| EP | 3560885 | A1 * | 10/2019 | .......... | B66F 9/07504 |
| EP | 3 659 961 | A1 | 6/2020 | | |
| JP | S48 42458 | Y1 | 12/1973 | | |
| JP | S51 10548 | Y1 | 3/1976 | | |
| JP | S51 35873 | U1 | 3/1976 | | |

OTHER PUBLICATIONS

International Search Report issued in International Patent Application No. PCT/AT2021/060386, dated Jan. 10, 2022, along with an English language translation thereof.

* cited by examiner

FORK TINE AND LOGISTICS VEHICLE

The present invention relates to a fork tine and a logistics vehicle for the same, as described in the claims.

Traditionally, fork tines are formed from the solid, wherein the shank, blade and heel are forged from one block. Fastening means, in particular eyelets and hooks, are attached, preferably welded to the shank. Such fork tines made from the solid have the major disadvantage that they are very heavy, whereby a correspondingly large size of the logistics vehicle is required to prevent the same from tipping over.

Furthermore, a fork tine is known from EP 0739854 A1, in which at least a part of the fork tine, in particular the shank, the heel or the blade, consists of several individual adjacent layers. The multiple layers are welded together to form the shape of the fork tine. The disadvantage here is that deformation can occur due to the high heat exposure caused by the welding process.

EP 0 739 854 A1 discloses the creation of a fork tine formed from several layers, which can be manufactured at low cost with low energy input and using universal tools with a wide variety of shapes and dimensions, even in the smallest lot sizes. In this process, easily manufactured slices are produced as parts of the forks, which are joined so as to be non-displaceable by fastening means such as screws, rivets or pins, or by bonding or welding, respectively. As a result, the forks produced from a large number of individual slices have a similar weight to, for example, forks made from solid material using a forging process.

Furthermore, DE 102019102846 A1 discloses a fork tine, in particular for industrial trucks, which is or can be, respectively, attached to a carrier guided by a lifting device. The load-handling device, which is formed by the heel and the shank, is formed from at least two slices or profiles, respectively, which are spaced apart from each other and which, on the one hand, are connected to the carrier and, on the other hand, are enclosed by at least regions of a fork blade consisting of at least one longitudinal hollow profile, wherein the longitudinal hollow profile is firmly connected to the slices.

Furthermore, a fork, in particular a fork blade, for an industrial vehicle such as a forklift truck and a method for its manufacture are known from EP 3659961 A1. The fork includes an elongated body portion, a fork tip and a fork taper that are joined, in particular welded, to form the fork, in particular the fork blade. The elongated body section may be formed to any length and may comprise multiple hollow chambers.

DE 4315891 C1 discloses a fork tine for forklift trucks that is designed approximately L-shaped. In order to manufacture such a fork, which allows fast, inexpensive and precise production at low cost on production lines, it is suggested that the fork blade and the fork shank be made of profile or bar sections, wherein a reinforcement is welded into the fork blade and a fork tip made of a forging welded to the end of the fork blade.

A disadvantage of the prior art as described above is that the production of the fork tines is very costly and the high heat exposure during the welding of the individual parts can lead to distortion to such an extent that the fork tines can no longer be used. Another disadvantage is that the production, in particular the welding of the parts, can be carried out only by appropriately trained specialists, in particular welders, which drives up the production costs.

The rapidly growing market of automated logistics vehicles, in particular autonomously moving forklift trucks, is changing the requirements for the very heavy fork tines that have been common until today.

Hence it is the objective of the present invention to create a fork tine and a logistics vehicle for this purpose, with which, on the one hand, the above-mentioned disadvantages are avoided and, on the other hand, such tines and vehicles can be produced with low energy expenditure and maximum possible flexibility in shape and dimensions in the smallest possible lot sizes.

This objective is achieved by the invention.

The fork tine is characterized in that, in order to form a cavity, the blade is formed from a top layer and a rear layer, which are joined, in particular screwed together, via fastening means, in particular screws.

The advantage of this is that it allows simple and inexpensive production, in which the individual elements are simply screwed together, which does not require any skilled staff such as welders. Furthermore, there is the requirement to make the fork as lightweight as possible in terms of the vehicle's energy balance, in particular in the case of counterbalanced forklifts, while also creating space for various sensor systems. In particular, the increasing compaction of production sites to make optimum use of the available space means that the weight above the tipping point must be kept as low as possible in order to be able to use a counterbalanced forklift of minimal size concomitantly with a large payload.

At the same time, the load capacity of the fork tines can be influenced by the fastening means or reinforcing elements, respectively, used or applied, respectively, i.e. a higher or lower load capacity can be achieved by using more or fewer fastening means or reinforcing elements, respectively. This allows adaptation to the loads to be lifted, which affects the manufacturing costs and the weight of the fork tine.

In addition, a standardized manufacturing process with consistently high quality can be ensured, since appropriate torque tools can be used for fastening the bolted joint, screwing together each fastening means with a defined torque.

Another major advantage of the modular design is that the top layer and the rear layer are preferably made from thin-walled straight sheets formed by a cold bending process, so that the shape of the fork tine can be easily adapted. Customer requirements can thus be implemented quickly and easily.

Advantageous embodiments are such in which the fork shank is also formed by a top layer and a rear layer which are joined, in particular screwed together, by fastening means, in particular screws. This in turn creates a cavity between the two elements, whereby considerable weight saving with high load capacity is achieved and sufficient space is left for electronics, in particular sensors, integrated into the fork tine.

Advantageous embodiments are such in which the top layer is formed from a sheet folded into U-shape and the rear layer from a flat sheet. This means that a bending process, in particular a cold bending process, needs to be applied only to one part or element, respectively, namely the top layer, far the manufacture of the fork tine, whereby manufacturing costs and manufacturing time are saved. It is, of course, also possible to produce a reverse structure, i.e. a flat top layer and a rear layer folded into U-shape, wherein it has been found advantageous in this case that the flat part is not positioned between the folded lateral parts of the rear layer, but rests on the end faces of the side parts.

Advantageous embodiments are also those in which the top layer and the rear layer are formed from a plate folded into U-shape, in particular a steel plate. Here it is possible that one of the two U-shaped parts is formed in such a way that it can be arranged between the folded lateral parts of the further element or that the top layer and the rear layer are joined via the end edges of the lateral parts, whereby a smaller edge length is required, which increases rigidity.

In an advantageous embodiment reinforcing elements are arranged in the cavity between the top layer and the rear layer. This means that the load-bearing capacity or load capacity, respectively, of the fork tine can be increased with little effort and, above all, little increase in weight. Furthermore, the load capacity can be increased or reduced by changing the distance height or spacing, respectively, between the cover and rear layers or by changing the sheet thickness. Such a structure is made possible by the modular design of the fork tine, since before the two elements, i.e. the top layer and the rear layer, are screwed together, the reinforcing elements can first be positioned accordingly, for example on the rear layer, and then the top layer is placed over it and screwed in place.

An embodiment in which the reinforcing elements accommodate the fastening means is advantageous. On the one hand, this ensures that the cavity is only slightly reduced so that there is still sufficient space for the sensor systems or electronics, respectively, and on the other hand, the dimensioning of the fastening means, in particular the screws, can be reduced because the force acts on the reinforcing means and no longer on the fastening means, which only have the task of holding the two parts, in particular the top layer and the rear layer, in position relative to each other.

However, in another advantageous embodiment the top layer of the fork shank and the fork blade has recesses to accommodate the fastening means, in particular the screw head, to form a flat surface. This ensures that no obstructive fastening means protrude above the surface of the top layer, so that when the fork tines are positioned, they can simply be pushed into a load carrier or pallet, in particular a Euro pallet. This means that the top layer cannot get stuck when the load or pallet, respectively, is picked up, as the surface is designed to be flat.

Advantageous embodiments are such in which the top layer of the fork shank and the fork blade has further bores for fastening additional auxiliary means. This makes it possible, for example, for some or all, respectively, of the bores to be threaded so that appropriate auxiliary means, such as eyelets or rings, which have a threaded element, can be screwed in. This also allows the fork tine to be easily attached to a logistics vehicle.

An advantageous design is one in which the heel is formed to correspond to the cavity and can be inserted over a partial area of the cavity of the fork shank and the fork blade. This ensures that the heel can be inserted into the cavity over a defined length and can be connected to the top layer and rear layer to form an L-shaped fork tine for use with logistics vehicles or forklifts. This also makes it possible, for example, for the fork blade to be replaced easily at a later date by loosening the fastening means for connecting the fork blade to the heel, pulling the fork blade off the heel, and fitting and screwing on a different fork blade, for example with a shorter fork length.

Here it is envisaged that the arrangement of the mounting bores for the heel will be standardized. It is possible that the arrangement of the fastening bores for the shank and the fork blade can be the same or different.

To enable the shank to be fastened to the fork blade and/or fork shank, the fork heel has bores to accommodate the fastening means. Correspondingly, these bores are formed on the top layer and rear layer of the fork blade and the fork shank, so that the components can be connected to form a unit. This creates an L-shaped fork tine with a low weight, which can replace the heavy fork tines known from the prior art with approximately the same load capacity. As mentioned before, the modular design makes it possible to produce a wide variety of fork tines for different payloads easily and at low cost.

Advantageous embodiments are such in which the fork heel has a joint for folding up the fork blade, wherein the joint is preferably hydraulically or electrically controllable. This makes it possible for the blade to be folded up when the fork tine is not being used, allowing for space-saving movement of a logistics vehicle.

In an advantageous design, sensors, lines and electronic control units are arranged in the cavity of the fork blade and the fork shank and can be connected to a logistics vehicle via a connector on the fork shank. This allows the fork tine to be adapted or equipped, respectively, and expanded to meet today's requirements, in particular the specifications of Industry 4.0. Subsequent expansion is also possible, as only certain parts need to be mechanically reworked or replaced.

Furthermore, the objective of the present invention is achieved by a logistics vehicle, in particular an autonomously moving logistics vehicle, comprising at least a base vehicle with a lifting device for transporting loads, preferably onto a load carrier or a pallet, in particular a Euro pallet, in which a fork tine according to one of claims is attached to the lifting device.

The invention is further explained by means of the exemplary embodiments shown in the drawings, wherein, however, the invention is not limited to these exemplary embodiments.

It should be stated by way of introduction that, in the individual embodiments, identical parts are provided with the same reference numbers or same component designations, respectively, wherein the disclosures contained in the entire description can, by analogy, be transferred to identical parts with identical reference numbers or identical component designations, respectively. The position details selected in the description, such as, e.g., top, bottom, lateral, etc., likewise relate to the figure described, and in the event of a change of position, they are to be transferred to the new position by analogy. Individual features or feature combinations from the exemplary embodiments shown and described may also represent independent inventive solutions.

FIGS. 1 to 7 show a fork tine 1 and an exemplary embodiment on a logistics vehicle 2.

Figure 1:
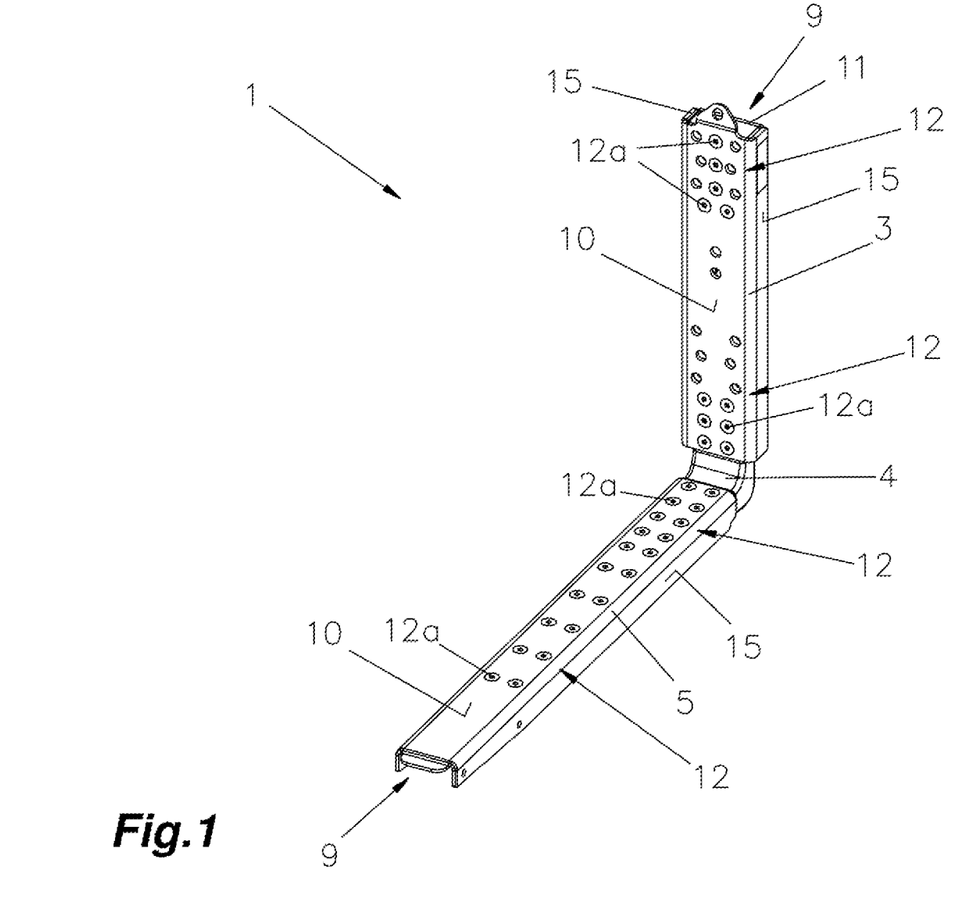
FIG. 1—a schematic representation of a fork tine for logistics vehicles or forklifts, simplified, for illustrative purposes only.
Figure 2:
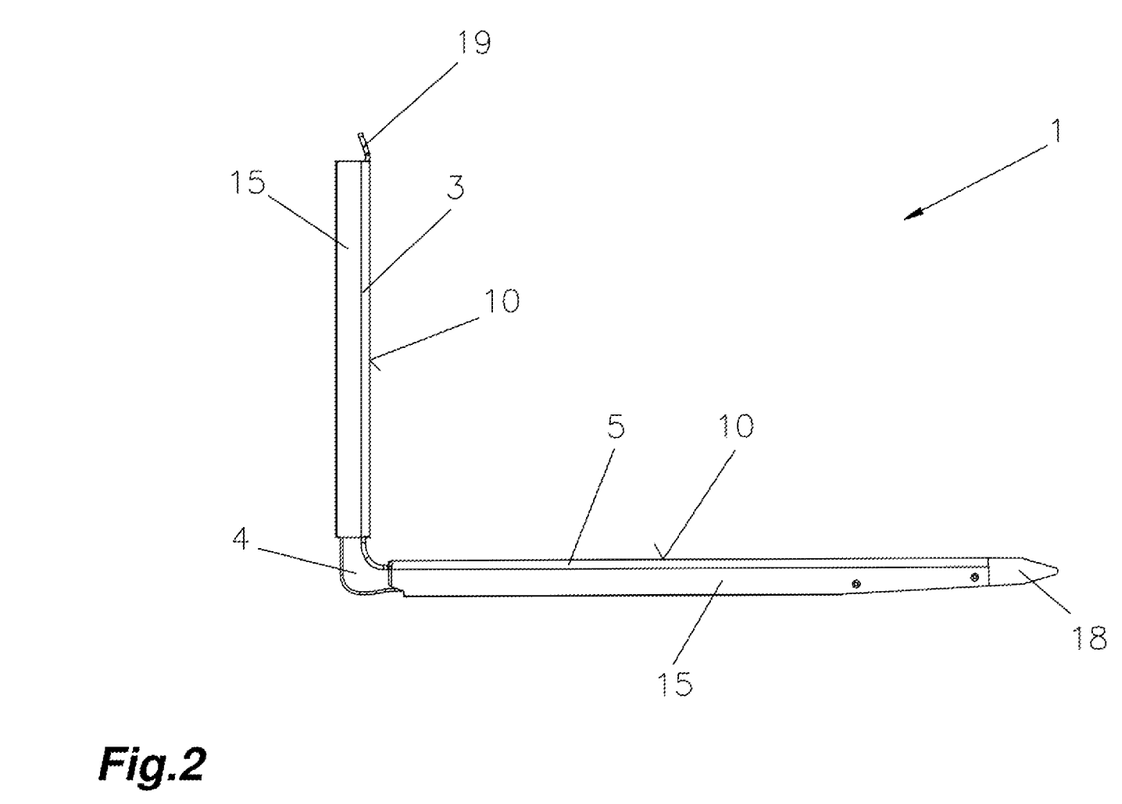
FIG. 2—a lateral view of the fork tine, simplified, for illustrative purposes only.
Figure 7:
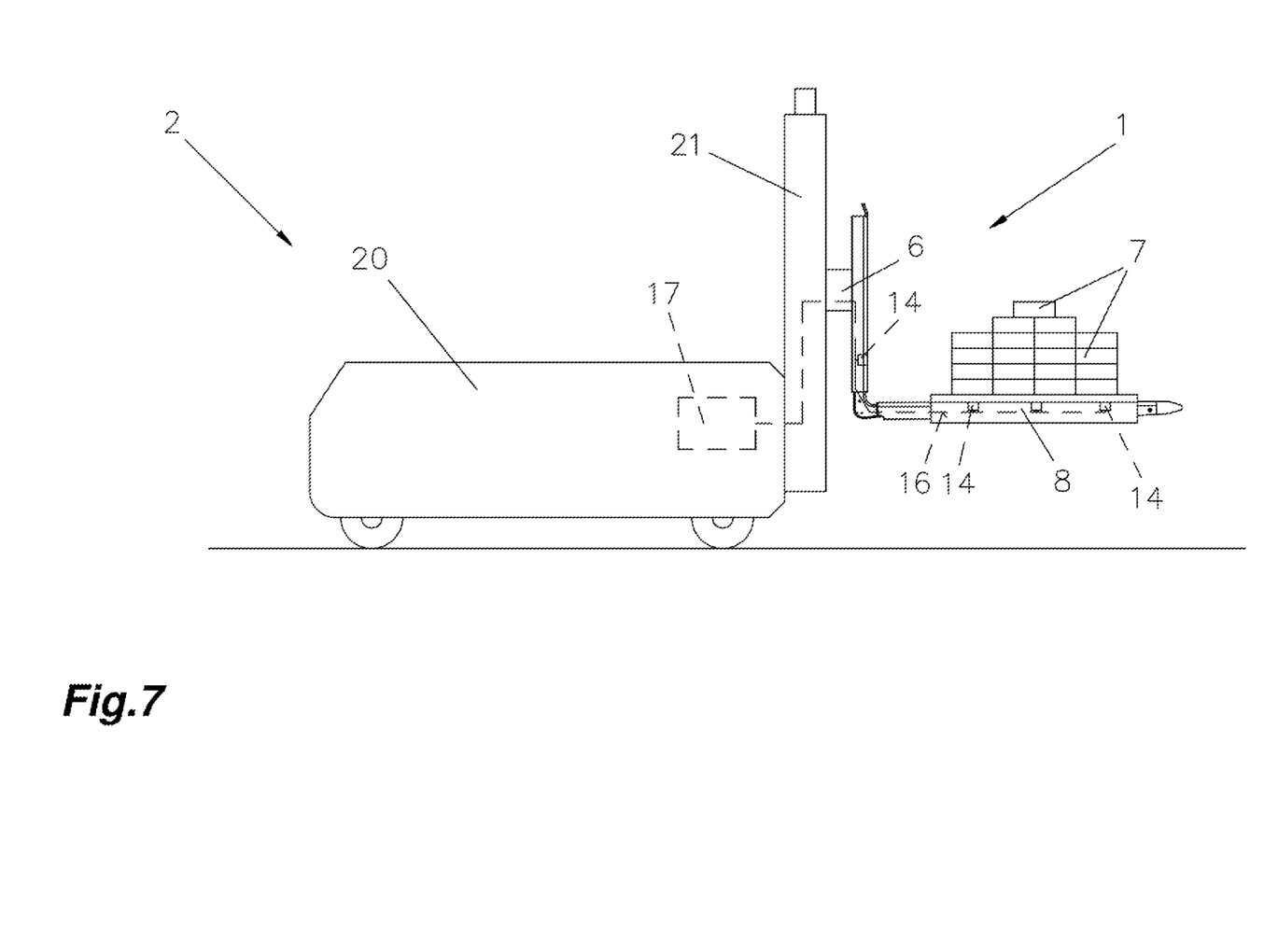
FIG. 7—an exemplary embodiment of a logistics vehicle with fork tine mounted thereon, simplified, for illustrative purposes only.

Such fork tines 1 usually have an L-shaped design and consist of three distinct sections, namely shank 3, heel 4 and blade 5. In this case, the fork shank 3 is used for fastening to logistics vehicles or forklifts, so that corresponding fastening elements 6 are provided. A load 7 to be transported, which is preferably positioned on a pallet 8, in particular a Euro pallet 8, is picked up with the fork blade and then transported by the logistics vehicle 2 or forklift truck to a defined storage location.

It is thus essential that such fork tines 1 have an optimum ratio between their own weight and load capacity in order, on the one hand, to be able to use a smaller logistics vehicle 2 and, on the other hand, to be able to carry a higher load 7. Which results in a smaller footprint, in particular turning circle, and improved energy efficiency.

Figure 3:
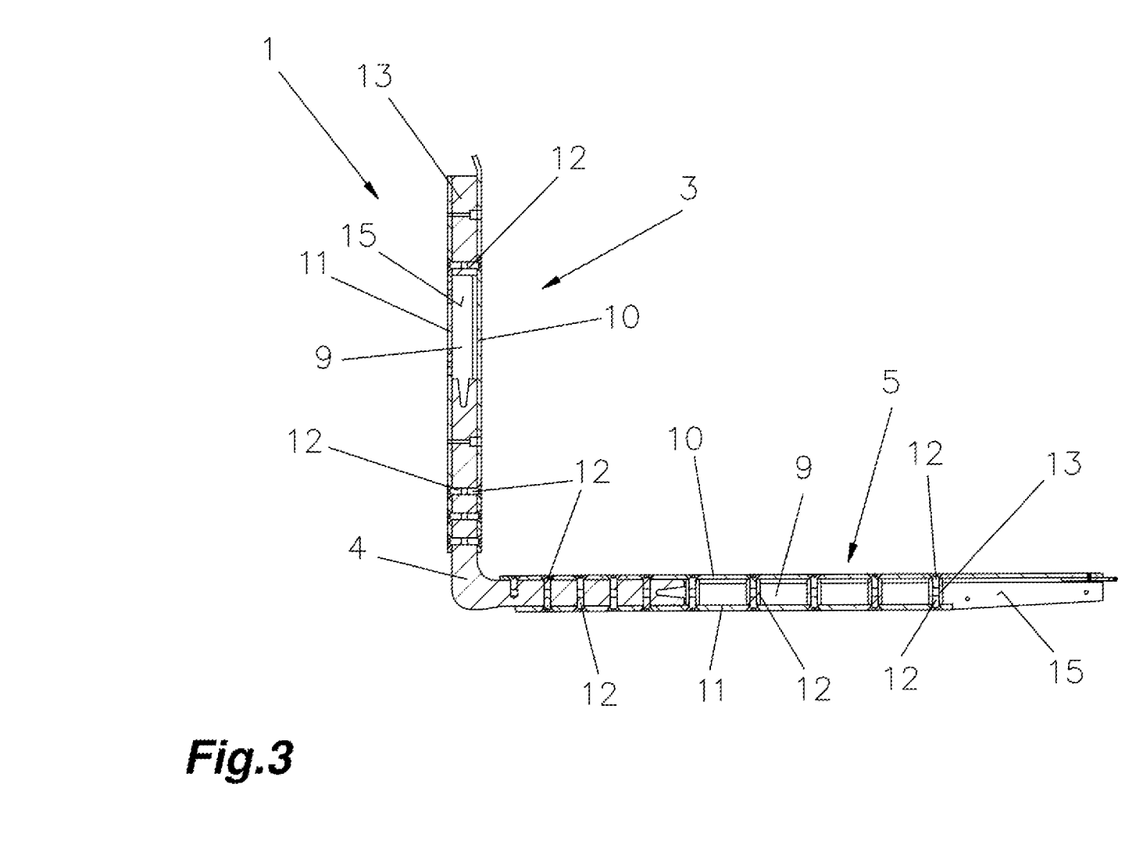
FIG. 3—a sectional view of the fork tine, simplified, for illustrative purposes only.

According to the present invention, it is envisioned to this end that at least the fork blade 5 is of modular design, wherein the fork blade 5 is formed from a top layer 10 and a rear layer 11 to form a cavity 9, which are joined, in particular screwed together, via fastening means 12, in particular screws 12a. Preferably, for further weight saving, the fork shank 3 is also modularly built from a top layer 10 and a rear layer, which are joined or screwed together, respectively, by fastening means 12, in particular screws 12a.

The shank 3 and the fork blade 5 are made from thin-walled straight sheets, preferably formed by a cold bending process, wherein one or several reinforcing elements 13, in particular metal spacers, which may also be made of metal alloy, are arranged in the vertical fork blade 5 and in the horizontal fork shank. Preferably, the reinforcing elements have bores through which the fastening means 12, in particular screws 12a, extend.

This creates the cavity 9 in the blade 5 and in the shank 3, which contributes greatly to the weight saving of the fork tine 1 and provides space for electronics and/or sensor systems 14 and cabling. This makes optimum use of the stress profile with tension and compression zones with the neutral fiber in the fork tine 1. The compact fork heel 4 also further favors the ratio of deflection to stresses that occur. In this case, the compact heel 4 is preferably made from quenched and tempered cast steel of high strength, including subsequent mechanical processing, or alternatively cut from a rolled steel part including mechanical finishing. A plasma, laser or waterjet process can be used as the cutting process. Alternatively, the heel can also be manufactured using previously known and common manufacturing options and then joined to the fork shank and the fork blade via the fastening means 12, in particular a screw connection. This means that the individual sheets, i.e. the top layer 10 and the rear layer 11, for the fork blade 5 and the fork shank 3, are joined to the fork heel 4 via the fastening means 12, for which corresponding bores are previously made on the fork heel 4. However, it is also possible to use a manufacturing method in which first the top layers 10 and rear layers 11 are lightly screwed together using the reinforcing elements, and then the heel is inserted into the cavity 9 and screwed together with the fastening means 12, whereupon all the fastening means 12 are screwed tight with a predetermined torque.

Preferably, the reinforcing elements 13, in particular the bore arranged therein, are threaded so that the fastening means 12, in particular the screws 12a, are directly screwed together with the reinforcing elements 13, as can be seen in FIG. 3. This makes it easy, for example, for the reinforcing elements 13 to be connected to the rear layer 11 via the fastening means 12, whereupon only the top layer 10 then has to be placed on top and these are screwed together with the reinforcing elements 13 via fastening means 12. For this purpose, the top layer 10 as well as the rear layer have so-called countersunk bores in which the head, in particular the screw head, of the fastening means 12 is accommodated so there are no obstructive protrusions above the surface of the top layer 10 or rear layer 11. Likewise, it is possible that threads corresponding to the fastening means 12 are provided in the bores in the fork heel 4, so that the fastening of the top layer 10 and the rear layer 11 is carried out independently of each other directly on the fork heel 4.

When dimensioning the fork tine 1, it is possible that the heel 4, the blade 5 and the shank 3 can be designed for the respective locally occurring maximum stress amplitude and thus allow use of differing sheet materials and material thicknesses optimized for the respective load capacity, without having to consider the weldability of the materials, i.e., that the top layer 10 and the rear layer 11 as well as the heel 4 are formed from different materials, wherein a material composition can be used which does not need to be weldable, since the fork tine 1 is constructed completely without welded joints.

In applications subject to wear, it is advantageous if the fork blade 5, in particular the top layer 10 of the fork blade 5, is formed from wear-resistant sheet metal. It is possible to replace the individual parts, in particular the wear parts, easily and at low cost in the event of repair. Due to the complete absence of welds, all joints are designed as bolted connections, whereby use of any combination of materials is enabled. On the one hand, this saves a time-consuming manufacturing step and, on the other hand, no additional heat is introduced, so that no structural change can take place in the fork material and subsequent heat treatment is necessary. Another major advantage is that the elimination of weld seams means that thermal distortion can no longer occur, hence the need for subsequent straightening of the fork tines 1 is obviated.

Figure 4:
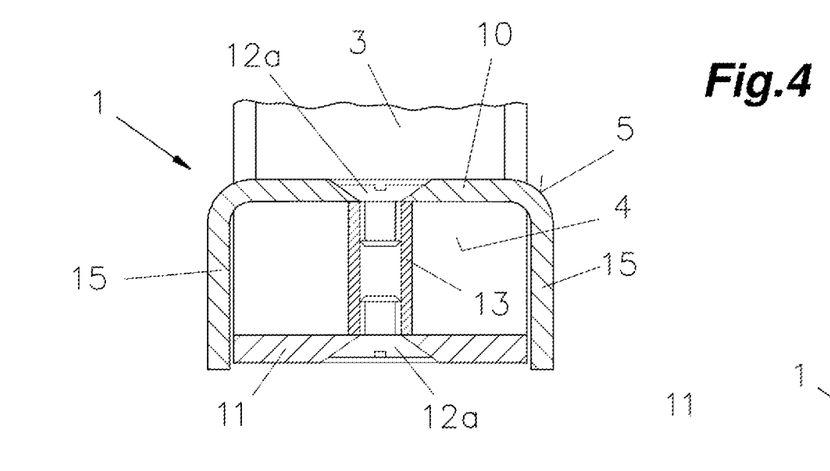
FIG. 4—a sectional view of the blade, simplified, for illustrative purposes only.

Basically, thus, the fork blade 5 and/or the fork shank 3 is constructed in such a way that at least one element, in particular the top layer 10, is U-shaped, wherein the lateral parts 15 are produced by means of a bending process, as can be seen more clearly from FIG. 4. From this it can be seen that the rear layer 11 is accommodated between the lateral parts 15, wherein the cavity 9 is formed between the top layer 10 and the rear layer. Of course, it is possible for the rear layer to butt against the end faces of the lateral parts 15, whereby in turn the cavity 9 is formed.

In order to increase the load capacity of the fork tine 5 and/or the shank 3, reinforcing elements 13 are arranged between the top layer 10 and the rear layer 11 so that when the load acts on the top layer 10, it cannot be pressed, in particular deformed, in the direction of the rear layer 11. The reinforcing elements 13 are preferably provided with a bore designed in such a way that the fastening means 12 can be accommodated therein, i.e. that the fastening means 12 pass through the reinforcing elements 13, whereby a space-saving arrangement is achieved so that sufficient space is left for the electronics and/or sensor systems 14 in the cavity 9. The use of reinforcing elements 13 has the advantage that they are arranged distributed over the surface of the top layer 10 or rear layer 11, respectively, in such a way as to achieve the highest possible load capacity with the lowest possible weight of the fork tine 1.

Figure 5:
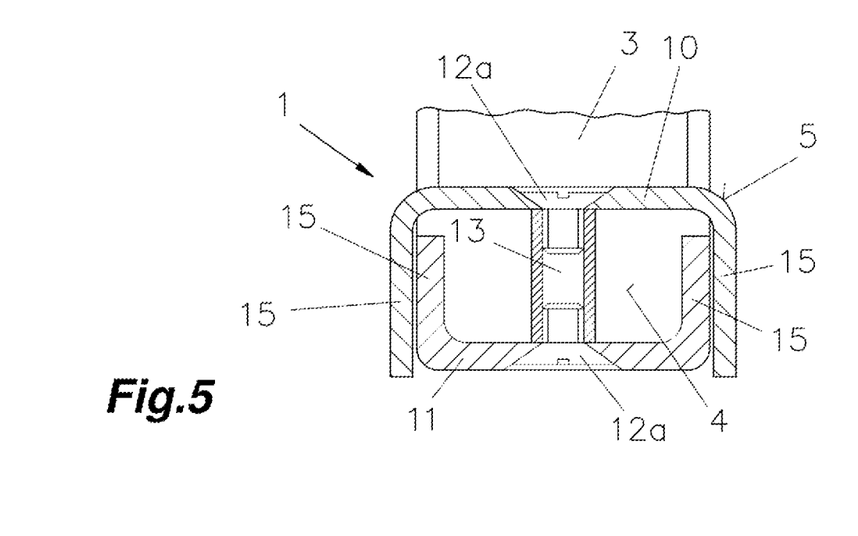
FIG. 5—another exemplary embodiment of the structure of the fork tine in cross-sectional view; simplified, for illustrative purposes only.
Figure 6:
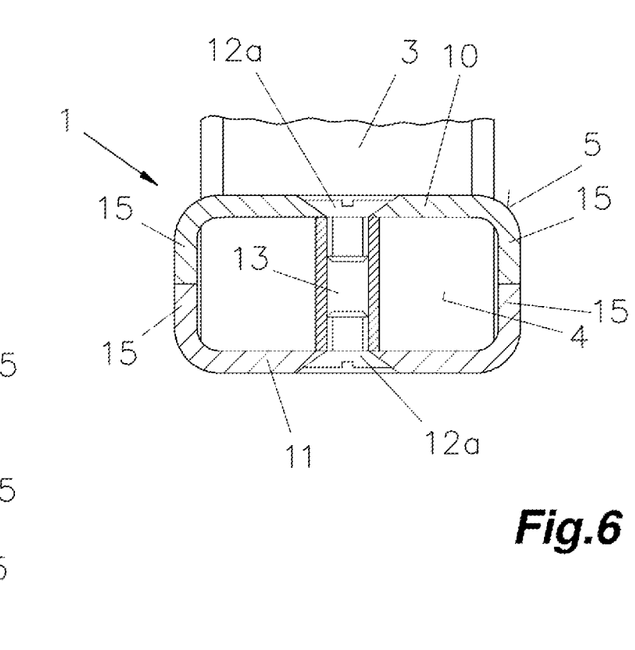
FIG. 6—another exemplary embodiment of the structure of the fork tine in cross-sectional view; simplified, for illustrative purposes only.

Of course, a different modular design is also possible, in which the top layer 10 and the rear layer 11 of the fork blade 5 and/or the fork shank 3 have a U-shaped design, as shown in FIGS. 5 and 6. In FIG. 5, the two elements, i.e. the top layer 10 and the rear layer 11, are designed in such a way that one part, preferably the rear layer 11, is inserted between the lateral parts 15 of the top layer 10 and reinforcing elements 13 with fastening means 12 running in the center are used in turn to increase the load capacity. In this context, it is also possible for the top layer 10 and the rear layer 11 to be connected, in particular screwed together, by means of fastening means 12 via the lateral parts 15, which are produced on the basis of a bending process.

In the embodiment in FIG. 6, by contrast, the top layer 10 and the rear layer 11 are formed so as to be of the same width, so that the end faces of the lateral parts 15 of the top layer 10 and the rear layer 11 butt on top of each other, wherein the reinforcing elements 13 are preferably in turn inserted in the cavity 9 with fastening means 12 running therein in order to increase the load capacity.

Furthermore, FIG. 7 shows an exemplary embodiment of the fork tine 1 on a logistics vehicle 2, which is, however, shown only schematically, since all logistics vehicles 2 and/or forklifts available on the market can be used with the fork tine 1 according to the present invention.

It can be seen that one or several fastening elements 6 are arranged on the shank 3, in particular on the rear layer 11 of the shank 3. These fastening elements 6 can be inserted into bores provided for this purpose in the rear layer 11, for which purpose bores with a thread are preferably provided so that the fastening elements, for example hooks or eyelets, can be screwed in. For the sake of completeness, it is mentioned that, of course, a wide variety of systems from the prior art can be used and fastened for attachment of a fork tine 1 to a logistics vehicle 2, wherein corresponding attachment points or bores, respectively, or even adapter plates are provided for this purpose.

Due to the special modular design of the fork tine 1, it is now easily possible to arrange electronics and/or sensors 14 in the shank 3 as well as in the blade 5, for which purpose the cable harness 16 can be laid in the cavity 9. Corresponding recesses can be provided in the top layers 10 and/or rear layers 11 for the sensors 14. For example, weight sensors can be arranged in the top layer 10 of the fork blade 5, which determines the load capacity and stores it, for example, in a database in the electronics or a control unit 17, respectively, in the logistics vehicle 2, so that analyses of the transported loads 7 can be made at any time.

For the sake of completeness, it is mentioned that the heel 4 may have a joint (not shown), whereby the fork blade 5 is folded up when the latter does not have to carry a load 7. In addition, since the horizontal and vertical area are realized by means of sheets, it is possible that lugs are included into the manufacture at low cost, which can be used as lifting and assembly aids for the fork tines 1. Furthermore, it is possible for the compact fork heel to be manufactured primarily from a process-monitored and fatigue-resistant quenched and tempered cast steel, so that the manufacturing process can produce a stress-optimized geometry with relevant cable bushings and outlets. By manufacturing the fork heel as a separate component, another advantage is that all other components are no longer thermally stressed, as is the case with the forging or upsetting forging process from the prior art. Furthermore, it should be mentioned that a fork tip 18 or other end pieces can be attached to the illustrated modular fork blade 3 on the opposite sides to the attached heel 4.

It can thus be said that the fork tine 1 according to the present invention is designed in such a way that a compact fork heel 4, which is predominantly made of quenched and tempered cast steel of high strength, including subsequent mechanical processing or alternatively cut (using plasma, laser or water jet) from a rolled steel part including mechanical finishing, is joined to the shank 3 and the blade 4 by means of screw connections 12, so that production is possible entirely without weld seams. Of course, additional auxiliary means 19, such as eyelets, lugs, etc., which cannot be attached via a screw connection 12, can also be welded to the fork tine 1.

It is further mentioned that not in all bores of the top layer 10 and/or the rear layer 11 a fastening means 12 is arranged, but that, depending on the required load capacity, corresponding reinforcing elements 13, with which the top layer 10 and the rear layer 11 are screwed together, are arranged. In this way, a standardized cut or production, respectively, can be created for a wide variety of fork tines 1 with differing load capacities.

Furthermore, FIG. 7 shows an exemplary embodiment of the fork tine 1 according to the present invention, in which a base vehicle 20 is shown with a lifting device 21 for transporting loads 7 preferably on a load carrier or pallet, in particular Euro pallet 8, wherein the fork tine 1 according to the invention is mounted on the lifting device 21, as previously described.

It is pointed out that the invention is not limited to the embodiments shown, but may comprise further embodiments. In particular, the embodiments or individual features of the embodiments can also be combined with each other.

The invention claimed is:

1. A fork tine configured for logistics vehicles, said fork tine comprising:
   at least a shank, a heel and a blade;
   wherein, in order to form a cavity, the blade and the shank are formed from a top layer and a rear layer which are fastened together via screws;
   wherein the heel is a separate component and is configured to correspond to the cavity between the top layer and the rear layer and is inserted over both a partial region of the shank and a partial region of the blade;
   wherein reinforcing elements are arranged in the cavity between the top layer and the rear layer of the blade and the top layer and rear layer of the shank; and
   wherein a distal end of the heel, in a first direction, and a distal end of the heel, in a second direction, orthogonal to the first direction, are provided within the cavity.

2. The fork tine according to claim 1, wherein:
   the top layer is formed from a sheet folded into a U-shape and the rear layer is formed from a flat sheet.

3. The fork tine according to claim 1, wherein:
   the top layer and the rear layer are formed from a steel plate folded into a U-shape.

4. The fork tine according to claim 1, wherein:
   the reinforcing elements are configured to accommodate the screws.

5. The fork tine according to claim 1, wherein:
   the top layer of the shank and the top layer of the blade have recesses to accommodate to form flat surfaces of heads of the screws.

6. The fork tine according to claim 1, wherein:
   the top layer of the blade further comprises bores for attachment of additional auxiliary elements.

7. The fork tine according to claim 1, wherein:
the heel has bores to accommodate the screws.

8. The fork tine according to claim 1, wherein
the heel is configured to allow the blade to be folded up.

9. The fork tine according to claim 1, further comprising:
sensors, lines, and electronic controllers arranged in the cavity of the blade and in the cavity of the shank, that can be connected to a logistics vehicle via a connecting plug on the shank.

10. The fork tine according to claim 1,
wherein the reinforcing elements extend continuously from the top layer to the rear layer, and
wherein the reinforcing elements are provided in a central portion of the cavity, the central portion being in a direction orthogonal to an extension direction of the reinforcing elements.

11. A logistics vehicle, comprising:
at least a base vehicle with a lifter for transporting loads onto a load carrier or on a pallet; and
wherein a fork tine according to claim 1 is attached to the lifter.

* * * * *